United States Patent
Perez et al.

(10) Patent No.: US 11,526,676 B2
(45) Date of Patent: Dec. 13, 2022

(54) IMPLICIT DISCOURSE RELATION CLASSIFICATION WITH CONTEXTUALIZED WORD REPRESENTATION

(71) Applicant: NAVER CORPORATION, Gyeonggi-do (KR)

(72) Inventors: Julien Perez, Grenoble (FR); Eric Jacques Guy Gaussier, Grenoble (FR); Diana Nicoleta Popa, Grenoble (FR); James Henderson, Vessy (CH)

(73) Assignee: NAVER CORPORATION, Gyeonggi-do (KR)

( * ) Notice: Subject to any disclaimer, the term of this patent is extended or adjusted under 35 U.S.C. 154(b) by 217 days.

(21) Appl. No.: 16/818,335

(22) Filed: Mar. 13, 2020

(65) Prior Publication Data
US 2020/0364409 A1    Nov. 19, 2020

Related U.S. Application Data

(60) Provisional application No. 62/849,206, filed on May 17, 2019.

(51) Int. Cl.
*G06F 40/35*        (2020.01)
*G06F 40/253*       (2020.01)
(Continued)

(52) U.S. Cl.
CPC ............ *G06F 40/30* (2020.01); *G06F 40/205* (2020.01); *G06F 40/284* (2020.01); *G06N 20/00* (2019.01)

(58) Field of Classification Search
CPC .... G06F 40/205; G06F 40/253; G06F 40/268; G06F 40/284; G06F 40/35; G06F 40/30; G06N 5/02; G06N 20/00
(Continued)

(56) References Cited

U.S. PATENT DOCUMENTS

| | | | |
|---|---|---|---|
| 2018/0018573 A1* | 1/2018 | Henderson | G06N 20/00 |
| 2018/0260381 A1* | 9/2018 | Carreras | G06F 40/253 |
| 2019/0228073 A1* | 7/2019 | Chatterjee | G06F 40/216 |

OTHER PUBLICATIONS

Geng et al., "Implicit Discourse Relation Identification based on Tree Structure Neural Network", 2017 International Conference on Asian Language Processing (IALP), pp. 334 to 337. (Year: 2017).*
(Continued)

*Primary Examiner* — Martin Lerner
(74) *Attorney, Agent, or Firm* — Harness, Dickey & Pierce, P.L.C.

(57) ABSTRACT

A method includes: initializing a list of token embeddings, each of the token embeddings corresponding to a tokenized word from text in a corpus of text; generating a graph for a group of consecutive words s from the text, said graph including binary relations between pairs of tokenized words of the group of consecutive words; selecting the token embeddings representing the words of the group of consecutive words from the list of token embeddings; computing a tensor of binary relations as the product between a matrix of the selected token embeddings and a tensor representing discourse relations, the computed tensor representing the binary relations between the pairs of tokenized words; computing a loss using the computed tensor; optimizing the list of token embeddings using the computed loss. The above may be repeated until the computed loss is within a predetermined range.

21 Claims, 4 Drawing Sheets

(51) Int. Cl.
  *G06F 40/284* (2020.01)
  *G06F 40/30* (2020.01)
  *G06F 40/205* (2020.01)
  *G06N 20/00* (2019.01)
(58) Field of Classification Search
  USPC .............................. 704/1, 9; 706/20, 46, 12
  See application file for complete search history.

(56) References Cited

OTHER PUBLICATIONS

Guo et al., "Implicit Discourse Relation Recognition via a BiLSTN-CNN Architecture with Dynamic Chunk-Based Max Pooling", IEEE Access, vol. 7, pp. 169281 to 169292. (Year: 2019).*

Li et al, "A Systematic Investigation of Neural Models for Chinese Implicit Discourse Relationship Recognition", 2019 International Conference on Asian Language Processing (IALP), pp. 390 to 395. (Year: 2019).*

Xu et al., "Connective Prediction using Machine Learning for Implicit Discourse Relation Classification", The 2012 International Joint Conference on Neural Networks (IJCNN), 8 Pages. (Year: 2012).*

Ji, Y., and Eisenstein, J. 2015. One vector is not enough: Entity-augmented distributed semantics for discourse relations. In TACL.

Ji, Y.; Haffari, G.; and Eisenstein, J. 2016. A latent variable recurrent neural network for discourse-driven language models. In Proceedings of NAACL HLT.

Kim, Y. 2014. Convolutional neural networks for sentence classification. In Proceedings of EMNLP.

Kingma, D., and Ba, J. 2014. Adam: A method for stochastic optimization. In Proceedings of ICLR.

Lan, M.; Wang, J.; Wu, Y.; Niu, Z.-Y.; and Wang, H. 2017. Multi-task attention-based neural networks for implicit discourse relationship representation and identification. In Proceedings of EMNLP.

Levy, O., and Goldberg, Y. 2014. Dependency-based word embeddings. In Proceedings of ACL.

Lin, Z.; Kan, M.-Y.; and Ng, H. T. 2009. Recognizing implicit discourse relations in the penn discourse treebank. In Proceedings of EMNLP.

Liu, Y., and Li, S. 2016. Recognizing implicit discourse relations via repeated reading: Neural networks with multilevel attention. In Proceedings of EMNLP.

Liu, Y.; Li, S.; Zhang, X.; and Sui, Z. 2016. Implicit discourse relation classification via multi-task neural networks. In Proceedings of AAAI.

McCann, B.; Bradbury, J.; Xiong, C.; and Socher, R. 2017. Learned in translation: Contextualized word vectors. In Proceedings of NIPS 30.

Mikolov, T.; Sutskever, I.; Chen, K.; Corrado, G. S.; and Dean, J. 2013. Distributed representations of words and phrases and their compositionality. In Proceedings of NIPS 26.

Mrkšic, N.; OSéaghdha, D.; Thomson, B.; Gašic, M.; Rojas-Barahona, L.; Su, P.-H.; Vandyke, D.; Wen, T.-H.; and Young, S. 2016. Counter-fitting word vectors to linguistic constraints. In Proceedings of NAACL HLT.

Pennington, J.; Socher, R.; and Manning, C. D. 2014. Glove: Global vectors for word representation. In Proceedings of EMNLP.

Peters, M. E.; Neumann, M.; Iyyer, M.; Gardner, M.; Clark, C.; Lee, K.; and Zettlemoyer, L. 2018. Deep contextualized word representations. In Proceedings of NAACL HLT.

Peters, M.; Ammar, W.; Bhagavatula, C.; and Power, R. 2017. Semi-supervised sequence tagging with bidirectional language models. In Proceedings of ACL.

Pitler, E.; Louis, A.; and Nenkova, A. 2009. Automatic sense prediction for implicit discourse relations in text. In Proceedings of ACL.

Popa, Diana Nicoleta, et al.; "Implicit Discourse Relation Classification with Syntax-Aware Contextualized Word Representations", Naver Labs Europe, Idiap Research Institute, May 2019; 6 Pages.

Prasad, R.; Dinesh, N.; Lee, A.; Miltsakaki, E.; Robaldo, L.; Joshi, A.; and Webber, B. 2008. The Penn Discourse TreeBank 2.0. In Proceedings of LREC.

Qin, L.; Zhang, Z.; and Zhao, H. 2016a. Implicit discourse relation recognition with context-aware character-enhanced embeddings. In Proceedings of COLING.

Qin, L.; Zhang, Z.; and Zhao, H. 2016b. A stacking gated neural architecture for implicit discourse relation classification. In Proceedings of EMNLP.

Qin, L.; Zhang, Z.; Zhao, H.; Hu, Z.; and Xing, E. 2017. Adversarial connective-exploiting networks for implicit discourse relation classification. In Proceedings of ACL.

Salant, S., and Berant, J. 2018. Contextualized word representations for reading comprehension. In Proceedings of NAACL HLT.

Tu, L.; Gimpel, K.; and Livescu, K. 2017. Learning to embed words in context for syntactic tasks. In Proceedings of the 2nd Workshop on Representation Learning for NLP.

Wang, Y.; Li, S.; Yang, J.; Sun, X.; and Wang, H. 2017. Tag-enhanced tree-structured neural networks for implicit discourse relation classification. In Proceedings of IJCNLP.

C. Braud and P. Denis. 2016. *Learning connective-based word representations for implicit discourse relation identification.*

E. Pitler, M. Raghupathy, H. Mehta, A. Nenkova, A. Lee, and A. Joshi. 2008. *Easily identifiable discourse relations.*

J. Chen, Q. Zhang, P. Liu, X. Qiu, and X. Huang. 2016. *Implicit discourse relation detection via a deep architecture with gated relevance network.*

Rutherford and N. Xue. 2015. *Improving the inference of implicit discourse relations via classifying explicit discourse connectives.*

W. Lei, X. Wang, M. Liu, I. Ilievski, X. He, and M. Kan. 2017. *Swim: a simple word interaction model for implicit discourse relation recognition.*

Z. Dai and R. Huang. 2018. *Improving Implicit Discourse Relation Classification by Modeling Interdependencies of Discourse Units in a Paragraph.*

* cited by examiner

IMPLICIT DISCOURSE RELATION CLASSIFICATION WITH CONTEXTUALIZED WORD REPRESENTATION

CROSS REFERENCE TO RELATED APPLICATIONS

This application claims the benefit of U.S. Provisional Application No. 62/849,206, filed on May 17, 2019. The entire disclosure of the application referenced above is incorporated herein by reference.

FIELD

The present disclosure relates to machine learning, and more particularly natural language processing (NLP), and more particularly to systems and methods for automatic identification of implicit discourse relations in text.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A discourse relation may be a description of how two segments of discourse are logically connected to each other. Discourse relation, which may be explicit or implicit, may also be referred to as rhetorical relation. Explicit discourse relations may be signaled by an explicit discourse connective (e.g., the connective "because" in the sentence: "They ate salad because they are vegetarians."), whereas implicit discourse relations may be signaled by an implicit discourse connective (e.g., the semantic relationship between the sentences: "They are vegetarians. They can't have meat in their salads.").

SUMMARY

In a feature, a method for determining a contextualized representation of words from a text includes: (a) by one or more processors, initializing a list of token embeddings, each of the token embeddings corresponding to a tokenized word from text in a corpus of text; (b) by the one or more processors, generating a graph ($G_s$) for a group of consecutive words s from the text, said graph including binary relations between pairs of tokenized words of the group of consecutive words; (c) by the one or more processors, selecting the token embeddings representing the words of the group of consecutive words from the list of token embeddings; (d) by the one or more processors, computing a tensor of binary relations as the product between a matrix of the selected token embeddings and a tensor representing discourse relations, the computed tensor representing the binary relations between the pairs of tokenized words; (e) by the one or more processors, computing a loss using the computed tensor; (f) by the one or more processors, optimizing the list of token embeddings using the computed loss; and (g) by the one or more processors, repeating (b)-(f) until the computed loss is within a predetermined range.

In further features, the generating the graph ($G_s$) includes generating the graph using a dependency parser.

In further features, the generating the graph ($G_s$) includes generating the graph using predetermined semantic information.

In further features, the computing the loss includes computing a loss including a ranking loss $T_{loss}^s$.

In further features, the method further includes, by the one or more processors, computing the ranking loss $T_{loss}^s$ using the equation $$T_{loss}^s = \sum_{\substack{t_{ijk}^s \in G_s, \\ t_{i'j'k'}^s \in \neg(t_{ijk}^s)}} \max(0, \gamma + \langle e_{i'}^s, R_{k'}, e_{j'}^s \rangle - \langle e_i^s, R_k, e_j^s \rangle)$$

where $G_s$ is the graph of a group s of consecutive words, $e_i^s$ is the token embedding of word token i in sentence s, $R_k$ is a matrix embedding for discourse relation k, $\gamma$ a margin parameter, $t_{ijk}^s$ is a positive triple, $\neg(t_{ijk}^s)$ a set of negative triples associated with $t_{ijk}^s$, where a product $\langle a, b, c \rangle$ is computed as $\langle a, b, c \rangle = a^{1 \times d} \cdot b^{d \times d} \cdot c^{d \times 1}$ and represents a score, and where the matrix embeddings are optimized by the ranking loss $T_{loss}^s$ as to score positive triples $t_{ijk}^s = (i,j,k)$ with scores higher than the scores of the negative triples.

In further features, the computing the loss includes computing a loss including a regularization term $R_{loss}^s$.

In further features, the method further includes, by the one or more processors, computing the regularization term $R_{loss}^s$ using the equation $$R_{loss}^s = \sum_{e_i^s \in G_s} -\log \sigma(e_i^s \cdot w_i^s)$$

where $G_s$ is the graph of a group s of consecutive words, $e_i^s$ is the token embedding of word token i in group s, $\sigma$ is the softmax function, and $w_i^s$ is a pre-trained word embedding representing the same word token as the token embedding $e_i^s$, and where the token embeddings are optimized by the regularization term $R_{loss}^s$ to minimize a distance between the token embedding $e_i^s$ and the pre-trained word embedding $w_i^s$ associated with a same word token.

In further features, the computing the loss includes computing a loss including a ranking loss $T_{loss}^s$ and a regularization term $R_{loss}^s$.

In further features, the method further includes, after the computed loss is within the predetermined range, by the one or more processors, using the token embeddings, performing implicit discourse relation classification on pairs of groups of words extracted from an input text.

In further features, the performing implicit discourse relation classification includes, by the one or more processors: transforming the words in the input text from the pairs of groups of consecutive words into token embeddings; modelizing both pairs of groups of consecutive words using a first set of trained neural network layers, the first set of trained neural network layers using the token embeddings as inputs, to learn a representation of the input text; and generating predicted discourse relations between both pairs of groups of consecutive words using a second set of trained neural network layers using the modelization of pairs of groups of consecutive words as inputs.

In further features, the optimizing the token embeddings uses multiple threads with initial learning rate values in a range between 10-3 and 10-5.

In further features, optimizing the list of token embeddings includes optimizing the list of token embeddings using an Adam optimizer.

In further features, the tensor representing discourse relations is a predetermined tensor.

In further features, the tensor representing discourse relations is a learned tensor.

In further features, the initializing includes initializing the list of token embeddings to word2vec embeddings.

In further features, the initializing includes initializing the list of token embeddings to GloVe embeddings.

In further features, the tokens include at least one of words, sentences, documents, and elements of text.

In further features, the tensor of binary relations includes a rank-3 tensor.

In further features, a non-transitory computer readable medium includes code including the method described above.

In a feature, a system for determining a contextualized representation of words from a text includes: one or more processors; and memory including code that, when executed by the one or more processors, execute functions including: (a) initializing a list of token embeddings, each of the token embeddings corresponding to a tokenized word from text in a corpus of text; (b) generating a graph ($G_s$) for a group of consecutive words s from the text, said graph including binary relations between pairs of tokenized words of the group of consecutive words; (c) selecting the token embeddings representing the words of the group of consecutive words from the list of token embeddings; (d) computing a tensor of binary relations as the product between a matrix of the selected token embeddings and a tensor representing discourse relations, the computed tensor representing the binary relations between the pairs of tokenized words; (e) computing a loss using the computed tensor; (f) optimizing the list of token embeddings using the computed loss; and (g) repeating (b)-(f) until the computed loss is within a predetermined range.

In a feature, a system for determining a contextualized representation of words from a text includes: a means for (a) initializing a list of token embeddings, each of the token embeddings corresponding to a tokenized word from text in a corpus of text; a means for (b) generating a graph ($G_s$) for a group of consecutive words s from the text, said graph including binary relations between pairs of tokenized words of the group of consecutive words; a means for (c) selecting the token embeddings representing the words of the group of consecutive words from the list of token embeddings; a means for (d) computing a tensor of binary relations as the product between a matrix of the selected token embeddings and a tensor representing discourse relations, the computed tensor representing the binary relations between the pairs of tokenized words; a means for (e) computing a loss using the computed tensor; a means for (f) optimizing the list of token embeddings using the computed loss; and a means for (g) repeating (b)-(f) until the computed loss is within a predetermined range.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
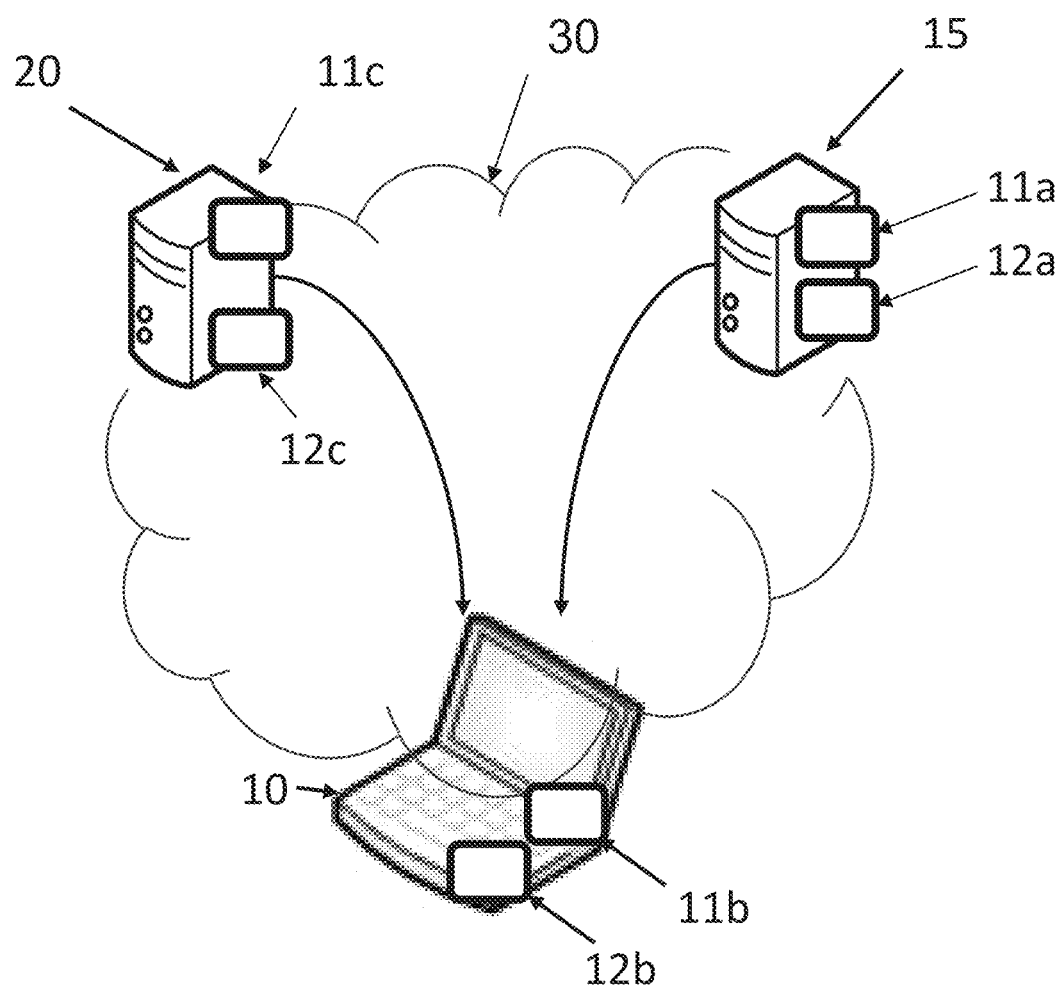
FIG. 1 illustrates an example of architecture in which a method is performed.

Once determined, implicit discourse relations may be used advantageously in many downstream NLP applications such as question answering, machine translation, automatic summarization, and information extraction. While identifying discourse relations in the presence of explicit connectives may be identified with high levels of accuracy, (e.g., with accuracy scores around 93%), it is more challenging to identify discourse relations in the absence of textual cues (i.e., using implicit connectives). The release of the Penn Discourse Treebank (PDTB), a large annotated corpus of discourse relations, may help advance research in the field of automatic identification of implicit discourse relations in text.

In the PDTB, documents are annotated following the predicate-argument structure. More specifically, an explicit discourse connective (e.g., but, because) is treated as a predicate that takes two text spans around it as its arguments, further denoted as Arg-1 and Arg-2. Each argument can be a single sentence, a clause or multiple sentences.

The task of recognizing implicit discourse relations may be approached as a classification problem, with the two arguments as input and their implicit discourse relation as the label to predict.

Labeled and unlabeled data (implicit and explicit) coming from different corpora may be used to classify discourse relations in multi-task learning frameworks. One may focus on the interaction between the two arguments either through attention mechanisms, through the use of features derived from word pairs or by directly modelling an argument pair jointly.

Regardless of the chosen approach however, accurately representing the arguments in a discourse relation may help build a reliable model. For this, standard word embeddings (i.e., a set of language modeling and feature learning techniques in NLP where words from the vocabulary, and possibly phrases thereof, are mapped to vectors of real numbers in a low dimensional space, relative to the vocabulary size) may be used as input to their proposed models. Further, to account for pre-trained word embeddings limitations and to integrate additional knowledge, complementary features may be employed with the consequence of making models more complex.

Some approaches may represent each argument using bottom-up compositional operations over its constituency parse tree along with a top-down approach for modelling coreferent entity mentions. Other approaches complement the use of word embeddings with extra linguistic features, such as part-of-speech tag embeddings or named entity tag embeddings, or consider character level information to enhance the word embeddings. Yet other approaches may focus on learning distributional word representations tailored specifically for implicit discourse relation classification.

The present application involves using token embeddings, which are used to represent a word in its context, with the same word bearing different representations in different contexts. This is unlike a generic word embedding representation, which is the same in every context.

The present application involves a method that includes, by one or more processors: learning token embeddings, representing contextualized words, on a set of text spans; and predicting discourse relations using the learned token embeddings.

The present application also involves a method to, by one or more processors, generate contextualized word representation. The method may be less costly in terms of computing resources than existing methods for generating contextualized word representations and provide similar and more accurate results.

For example, a method for the determination of a contextualized representation of words from a text may include, by one or more processors: initializing a list of token embeddings each token embeddings corresponding to a tokenized word from the text; generating of a graph ($G_s$) for a group of consecutive words s from the text, using a dependency parser or any precomputed semantic information, the graph providing binary relations between pairs of tokenized words of the group of consecutive words; selecting the token embeddings representing the words of the group of consecutive words from the list of token embeddings; computing a tensor of binary relations as the product between a matrix of the selected token embeddings and a tensor representing discourse relations, the tensor being either predetermined or learned, the tensor obtained representing the binary relations between the pairs of tokenized words; evaluating a loss function using the tensor of binary relation; optimizing the list of token embeddings using the computed loss; and repeating until the computed loss is within a given range. The above method may be useful for performing implicit discourse relation classification.

The computed loss may be a combination of a ranking loss $T_{loss}^s$ and a regularization term $R_{loss}^s$. The token embeddings may be optimized though minimizing:

$$\sum_{s \in S} \alpha(T_{loss}^s) + (1-\alpha)(R_{loss}^s)$$

where $T_{loss}^s$ is the ranking loss, and $R_{loss}^s$ is the additional regularization term, $\alpha$ is between 0 and 1, s is a group of consecutive words, S is the corpus.

The ranking loss $T_{loss}^s$ may be calculated as follows:

$$T_{loss}^s = \sum_{\substack{t_{ijk}^s \in G_s, \\ t_{i'j'k'}^s \in \neg(t_{ijk}^s)}} \max(0, \gamma + \langle e_{i'}^s, R_{k'}, e_{j'}^s \rangle - \langle e_i^s, R_k, e_j^s \rangle)$$

where $G_s$ is the graph of a group s of consecutive words generated by the external dependency parser, $e_i^s$ is the token embedding of word token i in sentence s, $R_k$ is a matrix embedding for discourse relation k, $\gamma$ is a margin parameter, $t_{ijk}^s$ is a positive triple, $\neg(t_{ijk}^s)$ is a set of negative triples associated with $t_{ijk}$, where a product $\langle a, b, c \rangle$ is computed as $\langle a, b, c \rangle = a^{1 \times d} \cdot b^{d \times d} \cdot c^{d \times 1}$ and represents a score, and where the matrices token embeddings are optimized by the ranking loss $T_{loss}^s$ so as to score positive triples $t_{ijk}^s = (i,j,k)$ with scores higher than the scores of the negative triples.

The regularization term $R_{loss}^s$ may be calculated as follows:

$$R_{loss}^s = \sum_{e_i^s \in G_s} -\log \sigma(e_i^s \cdot w_i^s)$$

where $G_s$ is the graph of a group s of consecutive words, $e_i^s$ is the token embedding of word token i in group s, a is the softmax function, and $w_i^s$ is a pre-trained word embedding representing the same word token as the token embedding $e_i^s$, and where the token embeddings are optimized by the regularization term $R_{loss}^s$ to minimize a distance between the token embedding $e_i^s$ and the pre-trained word embedding $w_i^s$ associated with a same word token.

The learned token embeddings are used for implicit discourse relation classification on pairs of groups of consecutive words extracted from a text using a method including, by one or more processors: transforming the word from the pairs of groups of consecutive words into token embeddings, modelizing both pairs of groups of consecutive words using a first set of neural network layers, the first set of neural network layers using the token embeddings as inputs, to learn a representation of the sentences; predicting discourse relations between both pairs of groups of consecutive words using a second set of neural network layers using the modelization of pairs of groups of consecutive words as inputs.

The method may be implemented in code of a computer-readable medium. For example, a computer program product may include code which, when executed by one or more processors, cause the one or more processors to execute a method described herein.

The proposed methods can advantageously be used for machine translation, questions answering, automatic summarization, information retrieval, or another suitable task.

Architecture

A method for the determination of a contextualized representation of words presented herein may be implemented within a system architecture such as that illustrated in FIG. 1, which includes two servers 15 and 20 and a client device 10 that communicates over a network 30 (which may be wireless and/or wired) such as the Internet for data exchange. Each server 15 and 20 and the client device 10 include one or more data processors (e.g., 11a, 11c, and 11b, respectively) and memory (e.g., 12a, 12c, and 12b, respectively), such as one or more hard disks.

The server 15 may be a training dataset server including a corpus of text documents on which the contextualized representation of words is learned.

The server 20 may be a learning server implementing the learning of the contextualized representation of words using the corpus of documents stored on server 15 as input. Once trained, the server 20 may receive queries from client devices, determine responses to the queries, respectively, and transmit the responses to the respective client devices.

The client device 10 includes one or more data items to be classified. The operators of the equipment may be referred to as "clients" in the commercial meaning of the term, of the service provider operating the first and/or second servers 15, 20.

It is noted that the two servers 15 and 20 may be combined within a single server. In another embodiment, the functionality of the two servers 15 and 20 may be merged into the client device 10.

Figure 2:
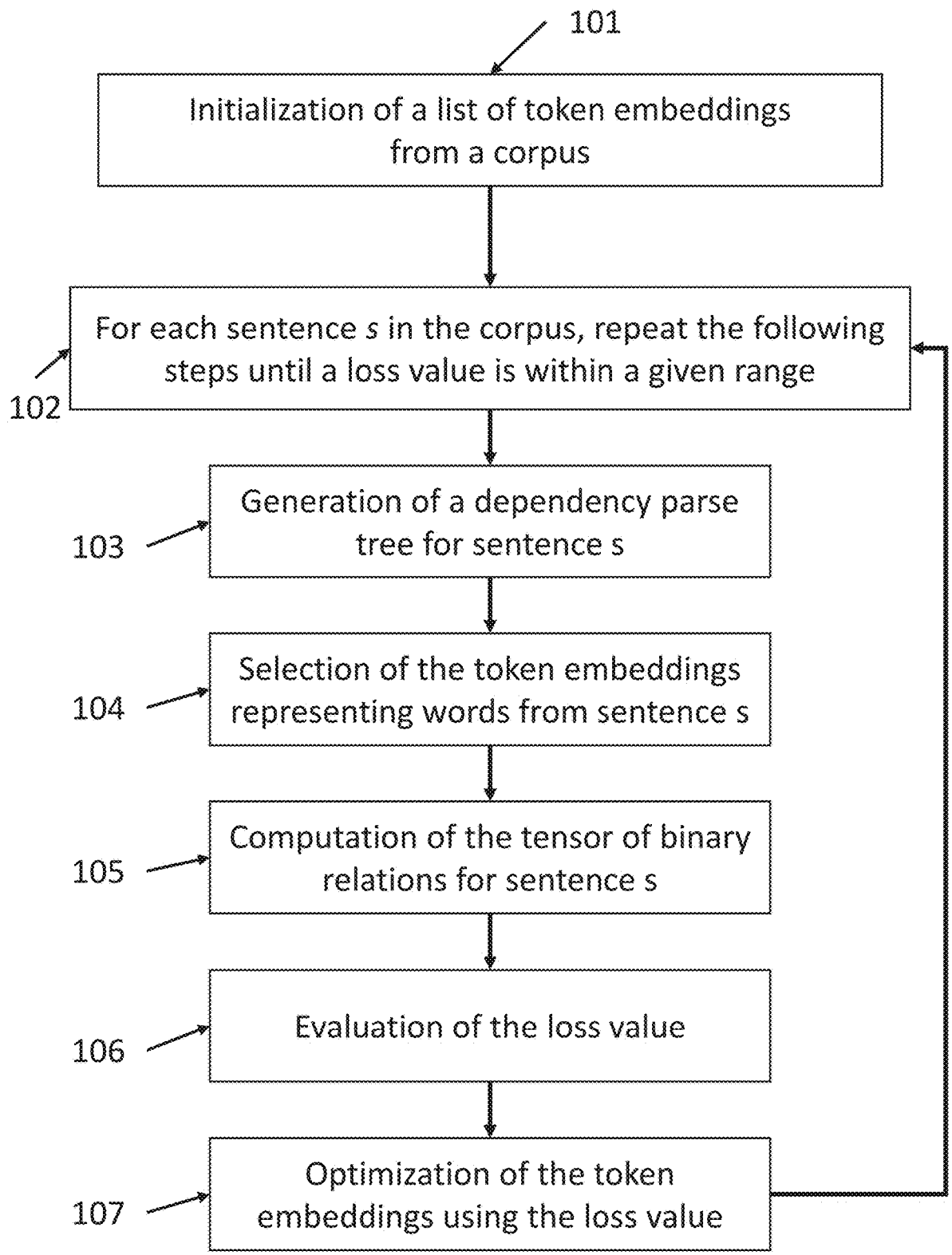
FIG. 2 illustrates a flowchart depicting a method used to classify implicit discourse relations.

A flowchart depicting a method for classifying discourse relation using token embeddings is illustrated in FIG. 2. The method may be performed, for example, by at least one processor of at least one of the server 15, the server 20, and the client device 10.

A list of token embeddings is initialized from pre-trained word embeddings such as word2vec or GloVe embeddings at 101 by one or more processors, where each token embedding corresponds to a tokenized word from the corpus. 102-107 repeat for each group of consecutive words (or text span) s from the corpus, such as a sentence (as shown in FIG. 2) or a paragraph, and until a loss value is within a given range.

At 103, a dependency parse tree for sentence s is generated by the one or more processors. At 104, token embeddings representing words from sentence s are selected by the one or more processors. At 105, a tensor of binary relations for sentence s is computed by the one or more processors. At 106, a loss value is determined and evaluated by the one or more processors. At 107, the token embeddings are optimized using the loss value by the one or more processors.

Then, the token embeddings can be used for various natural language processing tasks, such as automatic summarization, translation, or discourse argument prediction. For example, once trained, the one or more processors may receive a query including text from a client device, such as the client device 10, over a network. Based on the text, using the trained model, the one or more processors may perform at least one of natural language processing, automatic summarization, translation, and discourse argument prediction. The one or more processors transmit a response to the query to the client device that transmitted the query over the network where the response includes results of the processing performed.

Computing of the Tensor of Binary Relations

Learning embeddings is a task that is used to produce a meaningful numerical vector representation of an object. In the field of Natural Language Processing (NLP), the object, called tokens, might be words, sentences, entire documents, or a specific element of text.

The method disclosed herein, without supervision (i.e., unsupervised), generates token embeddings using a non-parametric model on the corpus of documents stored using one or more processors (e.g., of the server 20). The method relies on semantic information between pairs of tokens, such as dependency information which is obtained using a dependency parser by the one or more processors to identify the relations between words of a sentence.

At 103, the one or more processors generate a graph $G_s$ for sentence s, the graph being a dependency parse tree computed by a dependency parser. Information regarding immediate local context in the form of adjacency relations are also used with the dependency parser.

Figure 3:
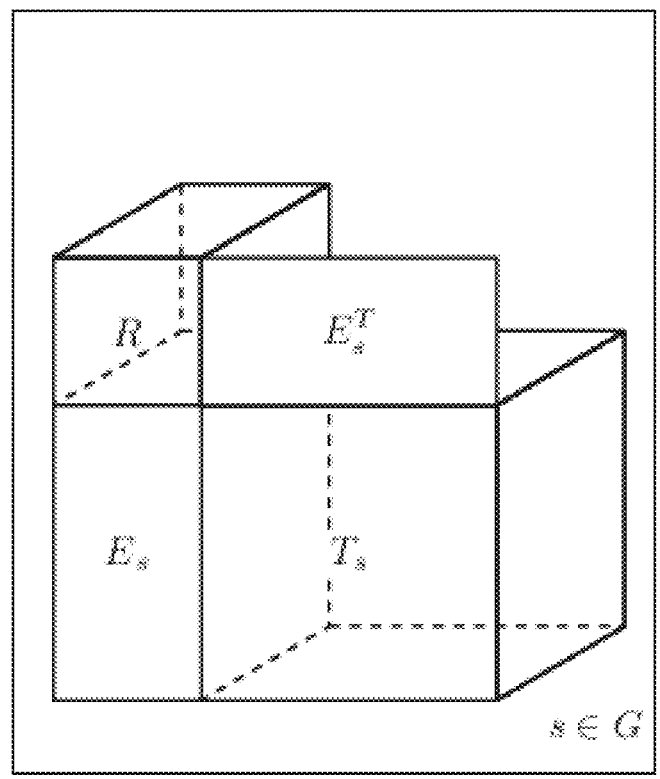
FIG. 3 illustrates decomposition of the token embeddings tensor.

At 104, the one or more processors extract the token embeddings representing the tokens of sentence s from the list of token embeddings. At 105, the interactions between the word tokens in the sentence are modelled by the one or more processors using, for example, a rank-3 tensor $T_s$ (see FIG. 3) representing the binary relations between tokens, which can be decomposed as seen in the FIG. 3 with:

G Corpus of sentence graphs;
$T_s$ r×|s|×|s| Relations between tokens in sentence s∈G;
R r×d×d Relation tensor embeddings;
$E_s$ |s|×d Token vector embeddings of token in s∈G;
d Size of the embedding vectors;
r Size of the binary relations;
|s| number of tokens in sentence s.

$$\forall s, T_s \approx E_s \cdot R \cdot E_s^T$$

At 106, the one or more processors compute a loss on the tensor $T_s$, including two terms:
$T_{loss}^s$ a ranking loss that constrains the model to score positive triples $t_{ijk}^s=(i,j,k)$ higher than negative ones, and
$R_{loss}^s$ a regularization term used to minimize a distance between the token embeddings and a pre-trained word representation of the words they denote, for example word2vec or GloVe embedding.

This leads to the one or more processors creating embeddings that are similar to the original word embeddings, which are known to capture semantics through $R_{loss}^s$, and at the same time are syntactically-informed, through $T_{loss}^s$, so as to capture fine-grained semantic differences according to the role a given word plays in a sentence.

In the example here described, $T_{loss}^s$ is a pair-wise ranking loss. However, another suitable loss can additionally or alternatively be computed, such as list-wise ranking loss.

At 107, the one or more processors optimize the token embeddings, such as follows:

$$\min \sum_{s \in S} \alpha(T_{loss}^s) + (1-\alpha)(R_{loss}^s)$$

where:

$$T_{loss}^s = \sum_{\substack{t_{ijk}^s \in G_s, \\ t_{i'j'k'}^s \in \neg(t_{ijk}^s)}} \max\left(0, \gamma + \langle e_{i'}^s, R_{k'}, e_{j'}^s \rangle - \langle e_i^s, R_k, e_j^s \rangle\right)$$

and $$R_{loss}^s = \sum_{e_i^s \in G_s} -\log \sigma(e_i^s \cdot w_i^s)$$

with $G_s$ being the graph of sentence s generated by the external dependency parser holding all tokens and all relations present in the sentence, $e_i^s$ is the token embedding of token i in sentence s, $R_k$ is the matrix embedding for the relation k, σ is the softmax function, and $w_i^s$ is the pre-trained word type embedding corresponding to the same word as token embedding $e_i^s$, γ is a margin hyperparameter, $\neg(t_{ijk}^s)$ is the set of negative triples associated with $t_{ijk}^s$, and the product $\langle a, b, c \rangle$ is computed as $\langle a, b, c \rangle = a^{1 \times d} \cdot b^{d \times d} \cdot c^{d \times 1}$.

$E_s$ is the matrix holding all token embeddings for sentence s, with one token embedding per row and R is the tensor of all relations, d denotes the dimensionality of the embeddings, and r denotes the number of relations. Thus, given all tokens in one sentence s, the relations tensor for sentence s, $T_s$, is approximated by $E_s^{(|s| \times d)} \cdot R^{(d \times r \times d)} \cdot E_s^{T(|s| \times d)}$.

The one or more processors obtain a negatively sampled example in the tensor by altering one element of the triple while fixing the remaining two: this element can be either one of the entities or the relation holding between them. As mentioned above, given a triple $t_{ijk}^s=(i,k,j)$, $\neg(t_{ijk}^s)$ denote the set of negative examples associated to it, and it is formed of the following elements:

$$\neg(t_{ijk}^s) = \{(i',k,j), (i,k',j), (i,k,j')\}; \forall i' \neq i, j' \neq j, k' \neq k$$

Finally, the one or more processors perform the optimization using mini-batch stochastic gradient descent. With batches $b_m$ constructed such that if $t_{ijk}^s \in b_m$ then

Modelling the Discourse Arguments

Figure 4:
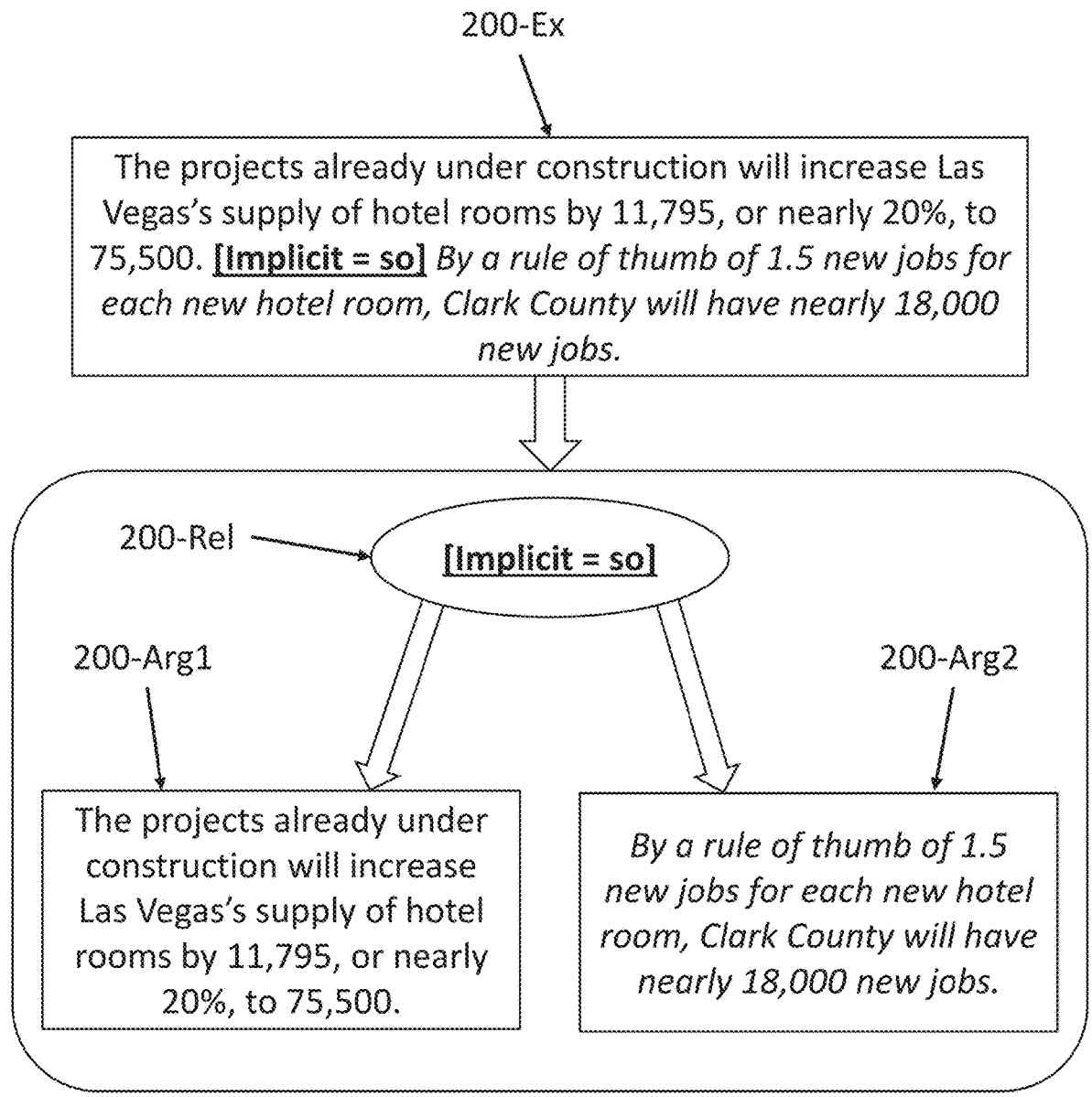
FIG. 4 illustrates an example of discourse containing an implicit relation.

A discourse relation is considered as a "predicate-argument" structure, more specifically, it is treated as a predicate that takes two text spans around it as its arguments, further denoted as Arg-1 and Arg-2. Each argument can be a single sentence, a clause or multiple sentences (a text span). An example of discourse is presented in FIG. 4 (200-Ex). In this example, Arg-1 (200-Arg1) is "The projects already under construction will increase Las Vegas's supply of hotel rooms by 11,795, or nearly 20%, to 75,500." and Arg-2 (200-Arg2) is "By a rule of thumb of 1.5 new jobs for each new hotel room, Clark County will have nearly 18,000 new jobs." In this example, the implicit relation (200-Rel) is: "so".

In order to classify discourse relations between two arguments Arg-1 and Arg-2 (of length n and m), the arguments are modelled as vectors by the one or more processors (e.g., of the server 20). For this purpose, each word w is associated with its vector representation $x_m \in \mathbb{R}^d$. Let $x_i^1$ and $x_i^2$ be the d-dimensional i-th word vector in Arg-1 and Arg-2 respectively. Then the word representations of the two arguments are:
Arg-1: $[x_1^1, x_2^1, \ldots, x_n^1]$
Arg-2: $[x_1^2, x_2^2, \ldots, x_n^2]$

Recurrent Neural Network

Two LSTM (Long Short-Term Memory) neural networks are used by the one or more processors (e.g., of the server 20) to model the two arguments Arg-1 and Arg-2 separately. Given a word sequence representation $[x_1, x_2; \ldots, x_k]$ as input, the LSTM neural network computes the hidden state sequence representation $[h_1, h_2; \ldots, h_k]$. At each time step i, the model reads $w_i$ as input and updates the $h_i$ hidden state. The final representations for the two arguments are then given by the last hidden state representation for each of them: Arg-1: $h_n$ and Arg-2: $h_m$.

Convolutional Architecture

Given a word sequence representation $[x_1, x_2; \ldots, x_k]$, $x_{i:i+j}$ is the concatenation of word vectors $x_i, x_{i+1}, \ldots, x_{i+j}$. $W \in \mathbb{R}^{h \times d}$ is a filter applied to a window of h words to produce a feature $c_i$. b is a bias term and f a non-linear function, then $c_i = f(W \cdot x_{i:i+h-1} + b)$.

A feature map $c \in \mathbb{R}^{n-h+1}$ is computed by the one or more processors (e.g., of the server 20) by applying the filter to each possible window of words in the argument $\{x_{1:h}, x_{2:h+1}, \ldots, x_{k-h+1:k}\}$. Thus $c = [c_1, c_2, \ldots, c_{k-h+1}]$. This is followed by a max-polling operation $\hat{c} = \max(c)$ by the one or more processors (e.g., of the server 20), to obtain the most important feature, namely the one with the highest value, corresponding to the particular filter. For m filters with different window sizes we obtain m features: $z = [\hat{c}_1, \hat{c}_2, \ldots, \hat{c}_m]$. The representation of each argument is thus the m-dimensional vector z: Arg-1: $z_1$ and Arg-2: $z_2$.

Predicting the Discourse Relation

The discourse relation holding between two arguments can be predicted by the one or more processors (e.g., of the server 20) with or without modeling the interaction between two arguments. Both approaches are presented in the following.

No Interaction Between Arguments

To train both neural networks (the LSTM or CNN and the classification neural network) a dataset of labeled implicit discourse relation can be used. These neural networks are considered as one, considering the CNN or LSTM as a first set of neural network layers, and the classification neural network as a second set of neural network layers.

Collaborative Gated Neural Network

A collaborative gated neural network (CGNN) architecture can be used by the one or more processors (e.g., of the server 20) to classify implicit discourse relations taking into account the interactions between the arguments. In this model, the arguments are represented using CNNs that share parameters as a first set of neural network layers and an additional gated unit is used for feature transformation as a second set of neural network layers. The input to the CGNN is the vector of the pair $v = [z_1, z_1]$ and the following set of transformation is applied:

$$\hat{c} = \tan h(W^c \cdot v + b^c)$$

$$g_i = \sigma(W^i \cdot v + b^i)$$

$$g_o = \sigma(W^o \cdot v + b^o)$$

$$c = \hat{c} \odot g_i$$

$$h = \tan h(c) \odot g_o$$

where $\sigma$ denotes the sigmoid function, $g_i$ and $g_o$ are two gated operations, $W^i$, $W^o$, and $W^c$ are parameters of the model, and $b^i$, $b^o$, and $b^c$ are bias terms, $\odot$ denotes the element-wise multiplication.

The output of the CGNN is the transformed vector h which is further passed to a softmax layer. When training this model, the training objective is thus defined as the cross-entropy between the output of the softmax layer and the class label.

Tests

Test Data

All the following tests were performed using the Penn Discourse Treebank (PDTB) 2.0 dataset, which includes 16224 argument pairs annotated with explicit and implicit discourse connective at three levels of granularity. The first level Level-1 contains four semantic classes, whereas the second level level-2 contains 16 types that provide finer semantic distinctions. Only implicit discourse relations are considered for the experiments. Two popular experimental setups were followed performing multi-class classification on both level-1 and level-2. The focus may be on the multi-class classification scenario, which may be more natural and realistic than "one-versus-all" classifiers.

A first split is based on sections 2-21 for training, 22 for development, and 23 for test. This split is further denoted as PDTB-Lin and multi-class classification is performed for level 2 classes. Only the 11 most frequent classes are selected. About 2.2% of the implicit relations are annotated with two types in PDTB. During training, instances with more than one annotation are considered as multiple instances, each with one class. During testing, a correct prediction is one that matches one of the annotated classes.

A second split is based on sections 2-20, 0-1 and 21-22 are used as training, development and test sets, respectively. This split is denoted as PDTB-Pitl and reported results are for level-1 multi-class classification. Focusing on the level-1 relations gives the ability to be theory-neutral as they represent the four core discourse relations that discourse analytic theories seem to converge on.

Implementation Details for the Token Embeddings

The one or more processors (e.g., of the server 20) may compute the token embeddings using multiple threads with initial learning rate values in the range $[10^{-3}, 10^{-5}]$, different negative sampling factors (1×, 2×, 3×), and $\gamma$ in [1, 2,10]. The ratio between the two losses may be set to $\alpha=0.5$, and the mini-batches size to 300. The optimizer of the one or more processors (e.g., of the server 20) used may be Adam, and early stopping may be realized (performed) based on the validation loss. The embeddings may be randomly initialized (since using pre-trained GloVe embeddings may not result in improvements). Better results may be obtained when using a learning rate of $10^{-3}$, a sampling factor of 5× and $\gamma$ set to 10. Only the dependency relations with a frequency higher than 1000 in the corpus may be considered, which correspond to the top 35 most frequent relations.

Implementation Details for the Implicit Discourse Relation Classification

The input embeddings may be fixed to be either the pre-trained word embeddings or the computed token embeddings. This may prevent an adaptation of the token embeddings to the end task and may not allow the representations of frequent words in the training data to distance themselves in the embedding space from the representations of related rare words. It may also enable a stricter assessment of the difference between word embeddings and token embeddings as input features.

For the optimization, the one or more processors (e.g., of the server 20) may implement an Adam optimizer and may tune the parameters on the development set. The parameters that lead to the reported results for each split are shown in Table 1 below, with $\alpha$ the learning rate, dp the dropout probability, nbh the size of the fully connected layer, szb the size of the batches and nbf the number of filters.

TABLE 1

Parameters used for results on each data split

| Data split | LSTM runs | | | CNN runs | | | | | CGNN runs | | | | |
| --- | --- | --- | --- | --- | --- | --- | --- | --- | --- | --- | --- | --- | --- |
| | a | dp | nbh | a | dp | nbf | szb | nbh | a | dp | nbf | szb | nbh |
| PDTB-Lin | $10^{-4}$ | 0.7 | 150 | $10^{-5}$ | 0.8 | 600 | 16 | 300 | $10^{-4}$ | 0.7 | 128 | 64 | 768 |
| PDTB-Pit1 | — | — | — | $10^{-5}$ | 0.6 | 600 | 16 | 512 | — | — | — | — | — |

Comparison to Word Embeddings

Table 2 presents the results of three sets of experiments on the PDTB-Lin data: the two LSTM or the CNN encoding approach followed by a fully connected layer and a softmax as presented earlier, and the collaborative architecture (CGNN). To compare the results, different input features are used: standard word embeddings that are often used (e.g., GloVe embeddings) and Word2vec embeddings, word embeddings trained using dependency contexts (DEPS word embeddings).

TABLE 2

Results for level-2 multi-class classification on PDTB-Lin

| | LSTM | CNN | CGNN |
| --- | --- | --- | --- |
| GloVe (Pennington et al., 2014) | 38.97 | 38.25 | 39.03 |
| Word2Vec (Mikolov et al., 2013) | 36.92 | 37.33 | 37.07 |
| Deps-WE (Levy and Goldberg, 2014) | 36.00 | 34.98 | 34.98 |
| Ours | 40.51 | 42.55 | 43.08 |

Using the proposed token embeddings as input may provide improvements over all the word embeddings presented as comparison across all architecture considered. Using an LSTM architecture may provide an improvement between 1.5% and 4.5%, between 3.7% and 7.5% with a CNN encoder and between 4% and 8% with the CGNN architecture. It appears that the more complex the architecture, the higher the improvement can be obtained over other types of word embeddings. This confirms that modelling the interaction between the two arguments can help in predicting the (e.g., implicit) discourse relation between the two arguments. Feeding token embeddings as input to an LSTM encoder may improve the results by up to 4.5%. The token embeddings also encode positional information by their construction using adjacency information, and thus they complement less the advantages of using an LSTM encoder. This is lower than the improvement of up to 8% observed when using the CGNN over the same embeddings.

The method described herein using syntactic dependencies achieves positive results. Other systems, however, may require additional data to train their models.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable code that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for determining a contextualized representation of words from a text, the method comprising:
   (a) by one or more processors, initializing a list of token embeddings, each of the token embeddings corresponding to a tokenized word from text in a corpus of text;
   (b) by the one or more processors, generating a graph ($G_s$) for a group of consecutive words s from the text, said graph including binary relations between pairs of tokenized words of the group of consecutive words;
   (c) by the one or more processors, selecting the token embeddings representing the words of the group of consecutive words from the list of token embeddings;
   (d) by the one or more processors, computing a tensor of binary relations as the product between a matrix of the selected token embeddings and a tensor representing discourse relations, the computed tensor representing the binary relations between the pairs of tokenized words;

(e) by the one or more processors, computing a loss using the computed tensor;

(f) by the one or more processors, optimizing the list of token embeddings using the computed loss; and (g) by the one or more processors, repeating (b)-(f) until the computed loss is within a predetermined range.

2. The method of claim 1, wherein the generating the graph ($G_s$) includes generating the graph using a dependency parser.

3. The method of claim 1, wherein the generating the graph ($G_s$) includes generating the graph using predetermined semantic information.

4. The method of claim 1, wherein the computing the loss includes computing a loss including a ranking loss $T_{loss}^s$.

5. The method of claim 4 further comprising, by the one or more processors, computing the ranking loss $T_{loss}^s$ using the equation $$T_{loss}^s = \sum_{\substack{t_{ijk}^s \in G_s, \\ t_{i'j'k'}^s \in \neg(t_{ijk}^s)}} \max(0, \gamma + \langle e_{i'}^s, R_{k'}, e_{j'}^s \rangle - \langle e_i^s, R_k, e_j^s \rangle)$$

where $G_s$ is the graph of a group s of consecutive words, $e_i^s$ is the token embedding of word token i in sentence s, $R_k$ is a matrix embedding for discourse relation k, $\gamma$ a margin parameter, $t_{ijk}^s$ is a positive triple, $\neg(t_{ijk}^s)$ a set of negative triples associated with $t_{ijk}^s$, where a product (a,b,c) is computed as $(a,b,c)=a^{1\times d}\cdot b^{d\times d}\cdot c^{d\times 1}$ and represents a score, and where the matrix embeddings are optimized by the ranking loss $T_{loss}^s$ as to score positive triples $t_{ijk}^s=(i,j,k)$ with scores higher than the scores of the negative triples.

6. The method of claim 1, wherein the computing the loss includes computing a loss including a regularization term $R_{loss}^s$.

7. The method of claim 6 further comprising, by the one or more processors, computing the regularization term $R_{loss}^s$ using the equation $$R_{loss}^s = \sum_{e_i^s \in G_s} -\log \sigma(e_i^s \cdot w_i^s)$$

where $G_s$ is the graph of a group s of consecutive words, $e_i^s$ is the token embedding of word token i in group s, $\sigma$ is the softmax function, and $w_i^s$ is a pre-trained word embedding representing the same word token as the token embedding $e_i^s$, and where the token embeddings are optimized by the regularization term $R_{loss}^s$ to minimize a distance between the token embedding $e_i^s$ and the pre-trained word embedding $w_i^s$ associated with a same word token.

8. The method of claim 1, wherein the computing the loss includes computing a loss including a ranking loss $T_{loss}^s$ and a regularization term $R_{loss}^s$.

9. The method of claim 1 further comprising, after the computed loss is within the predetermined range, by the one or more processors, using the token embeddings, performing implicit discourse relation classification on pairs of groups of words extracted from an input text.

10. The method of claim 9, wherein the performing implicit discourse relation classification includes, by the one or more processors:

transforming the words in the input text from the pairs of groups of consecutive words into token embeddings;

modelizing both pairs of groups of consecutive words using a first set of trained neural network layers, the first set of trained neural network layers using the token embeddings as inputs, to learn a representation of the input text; and generating predicted discourse relations between both pairs of groups of consecutive words using a second set of trained neural network layers using the modelization of pairs of groups of consecutive words as inputs.

11. The method of claim 1, wherein the optimizing the token embeddings uses multiple threads with initial learning rate values in a range between $10^{-3}$ and $10^{-5}$.

12. The method of claim 1, wherein optimizing the list of token embeddings includes optimizing the list of token embeddings using an Adam optimizer.

13. The method of claim 1, wherein the tensor representing discourse relations is a predetermined tensor.

14. The method of claim 1, wherein the tensor representing discourse relations is a learned tensor.

15. The method of claim 1, wherein the initializing includes initializing the list of token embeddings to word2vec embeddings.

16. The method of claim 1, wherein the initializing includes initializing the list of token embeddings to GloVe embeddings.

17. The method of claim 1, wherein the tokens include at least one of words, sentences, documents, and elements of text.

18. The method of claim 1, wherein the tensor of binary relations includes a rank-3 tensor.

19. A non-transitory computer readable medium including code including the method of claim 1.

20. A system for determining a contextualized representation of words from a text, the system comprising:
one or more processors; and
memory including code that, when executed by the one or more processors, execute functions including:
(a) initializing a list of token embeddings, each of the token embeddings corresponding to a tokenized word from text in a corpus of text;
(b) generating a graph ($G_s$) for a group of consecutive words s from the text, said graph including binary relations between pairs of tokenized words of the group of consecutive words;
(c) selecting the token embeddings representing the words of the group of consecutive words from the list of token embeddings;
(d) computing a tensor of binary relations as the product between a matrix of the selected token embeddings and a tensor representing discourse relations, the computed tensor representing the binary relations between the pairs of tokenized words;
(e) computing a loss using the computed tensor;
(f) optimizing the list of token embeddings using the computed loss; and
(g) repeating (b)-(f) until the computed loss is within a predetermined range.

21. A system for determining a contextualized representation of words from a text, the system comprising:
a means for (a) initializing a list of token embeddings, each of the token embeddings corresponding to a tokenized word from text in a corpus of text;
a means for (b) generating a graph ($G_s$) for a group of consecutive words s from the text, said graph including binary relations between pairs of tokenized words of the group of consecutive words;

a means for (c) selecting the token embeddings representing the words of the group of consecutive words from the list of token embeddings;

a means for (d) computing a tensor of binary relations as the product between a matrix of the selected token embeddings and a tensor representing discourse relations, the computed tensor representing the binary relations between the pairs of tokenized words;

a means for (e) computing a loss using the computed tensor;

a means for (f) optimizing the list of token embeddings using the computed loss; and a means for (g) repeating (b)-(f) until the computed loss is within a predetermined range.

* * * * *